(12) United States Patent
Ballard et al.

(10) Patent No.: US 10,428,843 B2
(45) Date of Patent: Oct. 1, 2019

(54) HYDRAULIC SYSTEM OF A TOOL

(71) Applicant: Milwaukee Electric Tool Corporation, Brookfield, WI (US)

(72) Inventors: James Ballard, Brookfield, WI (US); Ian Zimmermann, Brookfield, WI (US); Luke Skinner, Brookfield, WI (US); Eric Norquist, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 112 days.

(21) Appl. No.: 15/616,588

(22) Filed: Jun. 7, 2017

(65) Prior Publication Data

US 2017/0356472 A1    Dec. 14, 2017

Related U.S. Application Data

(60) Provisional application No. 62/347,577, filed on Jun. 8, 2016.

(51) Int. Cl.
*F15B 11/10* (2006.01)
*B23D 29/00* (2006.01)
(Continued)

(52) U.S. Cl.
CPC .............. *F15B 11/10* (2013.01); *B23D 17/06* (2013.01); *B23D 29/00* (2013.01); *B23D 29/002* (2013.01);
(Continued)

(58) Field of Classification Search
CPC ........ F15B 11/10; F15B 11/022; F15B 15/16; B23D 17/06; B23D 29/002
See application file for complete search history.

(56) References Cited

U.S. PATENT DOCUMENTS 4,339,942 A * 7/1982 Svensson ........... H01R 43/0427
                                                  60/479
4,604,890 A   8/1986 Martin
(Continued)

FOREIGN PATENT DOCUMENTS

EP    0676835 A2    10/1995

OTHER PUBLICATIONS

Form PCT/ISA/210, International Search Report issued in International Patent Application No. PCT/US2017/036481 dated Sep. 8, 2017.

*Primary Examiner* — Michael Leslie
*Assistant Examiner* — Daniel S Collins
(74) *Attorney, Agent, or Firm* — McDonnell Boehnen Hulbert & Berghoff LLP

(57) ABSTRACT

An example tool includes a hydraulic actuator cylinder; a piston slidably accommodated within the hydraulic actuator cylinder, where the piston includes a piston head and a piston rod extending from the piston head along a central axis direction of the hydraulic actuator cylinder, the piston head divides an inside of the hydraulic actuator cylinder into a first chamber and a second chamber, and the piston rod is disposed in the first chamber and configured to move one or more jaws of the tool; a pump configured to provide pressurized fluid; and a sequence valve configured to block the pressurized fluid from flowing into the second chamber of the hydraulic actuator cylinder until pressure of the pressurized fluid exceeds a threshold pressure value.

22 Claims, 8 Drawing Sheets

(51) Int. Cl.
- *F15B 13/02* (2006.01)
- *F15B 15/16* (2006.01)
- *F15B 15/20* (2006.01)
- *H01R 43/048* (2006.01)
- *B25F 5/00* (2006.01)
- *B23D 17/06* (2006.01)
- *B25B 27/10* (2006.01)
- *B25B 27/02* (2006.01)

(52) U.S. Cl.
CPC ............ *B25B 27/026* (2013.01); *B25B 27/10* (2013.01); *B25F 5/005* (2013.01); *F15B 13/027* (2013.01); *F15B 15/16* (2013.01); *F15B 15/202* (2013.01); *H01R 43/048* (2013.01); *F15B 2211/41581* (2013.01); *F15B 2211/6313* (2013.01); *F15B 2211/7057* (2013.01)

(56) References Cited

U.S. PATENT DOCUMENTS

| | | |
|---|---|---|
| 5,113,679 A | 5/1992 | Ferraro et al. |
| 5,152,196 A | 10/1992 | Garrett |
| 5,195,042 A | 3/1993 | Ferraro et al. |
| 5,979,215 A | 11/1999 | Lefavour et al. |
| 6,446,482 B1 | 9/2002 | Heskey et al. |
| 6,668,613 B2 | 12/2003 | Lefavour et al. |
| 6,986,274 B2 | 1/2006 | Lefavour et al. |
| 7,066,003 B2 | 6/2006 | Lefavour et al. |
| 7,254,982 B2 | 8/2007 | Frenken |
| 7,412,868 B2 | 8/2008 | Frenken |
| 7,421,877 B2 | 9/2008 | Frenken |
| 7,464,578 B2 | 12/2008 | Ayer et al. |
| 7,533,556 B2 | 5/2009 | Lefavour et al. |
| 7,614,139 B2 | 11/2009 | Itrich |
| 7,640,780 B2 | 1/2010 | Ruland |
| 9,016,317 B2 | 4/2015 | Myrhum, Jr. |
| 2005/0132771 A1 | 6/2005 | Lefavour et al. |

* cited by examiner

HYDRAULIC SYSTEM OF A TOOL

FIELD

The present disclosure relates generally to control of a Hydraulic tool.

BACKGROUND

A powered tool may include one or more movable blades that are actuatable by a hydraulic or electromechanical actuation system. By providing power to the actuation system, the blades move relative to each other to perform operations such as cutting, crimping, separation, blanking, etc.

SUMMARY

The present disclosure describes embodiments that relate to systems, tools, hydraulic circuits, and methods associated with control of a hydraulic tool.

In a first example implementation, the present disclosure describes a tool. The tool includes: (i) a hydraulic actuator cylinder; (ii) a piston slidably accommodated within the hydraulic actuator cylinder, where the piston includes a piston head and a piston rod extending from the piston head along a central axis direction of the hydraulic actuator cylinder, the piston head divides an inside of the hydraulic actuator cylinder into a first chamber and a second chamber, the piston is partially hollow, and the piston rod is disposed in the first chamber and configured to move one or more jaws of the tool; (iii) a pump configured to provide pressurized fluid; and (iv) a sequence valve configured to block the pressurized fluid from flowing into the second chamber of the hydraulic actuator cylinder until pressure of the pressurized fluid exceeds a threshold pressure value. When the tool is triggered the pump provides the pressurized fluid to a hollow portion of the piston, causing the piston to extend at a first speed until at least one of the one or more jaws reach an object placed therebetween. Thereafter, pressure of the pressurized fluid increases until the pressure reaches the threshold pressure value, causing the sequence valve to open providing a path for the pressurized fluid to the second chamber, causing the piston to extend at a second speed.

In a second example implementation, the present disclosure describes a hydraulic circuit. The hydraulic circuit includes (i) a hydraulic actuator cylinder; (ii) a piston slidably accommodated within the hydraulic actuator cylinder, where the piston includes a piston head and a piston rod extending from the piston head along a central axis direction of the hydraulic actuator cylinder, the piston head divides an inside of the hydraulic actuator cylinder into a first chamber and a second chamber, the piston is partially hollow, and the piston rod is disposed in the first chamber; (iii) a pump configured to provide pressurized fluid; and (iv) a sequence valve configured to block the pressurized fluid from flowing into the second chamber of the hydraulic actuator cylinder until pressure of the pressurized fluid exceeds a threshold pressure value. The pump provides the pressurized fluid to a hollow portion of the piston, causing the piston to extend at a first speed until the piston rod meets a resistance. Thereafter, pressure of the pressurized fluid increases until the pressure reaches the threshold pressure value, causing the sequence valve to open providing a path for the pressurized fluid to the second chamber, causing the piston to extend at a second speed.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

A powered tool is a tool that is actuated by an additional power source and mechanism other than the solely manual labor used with hand tools. Example power tools employ electric motors, hydraulic systems, etc. to power the tool.

A hydraulic tool could be used to cut or crimp cables for example. In an example, the hydraulic tool may include a cylinder and piston configuration, where the piston is configured to extend and retract, and thus move a blade or any other implement to perform a task (crimping, cutting, etc.).

To make a hydraulic tool more efficient, it is desirable to have a tool where the piston could move at variable speeds and apply different forces based on condition or state of the tool. For instance, the piston may be configured to move at a fast speed and apply a small force while travelling within its cylinder before a blade coupled to the piston reaches a cable to be cut. Once the blade reaches the cable, the piston may slow down, but cause the blade to apply a larger force to perform a cutting operation.

II. Example Tool

Figure 1:
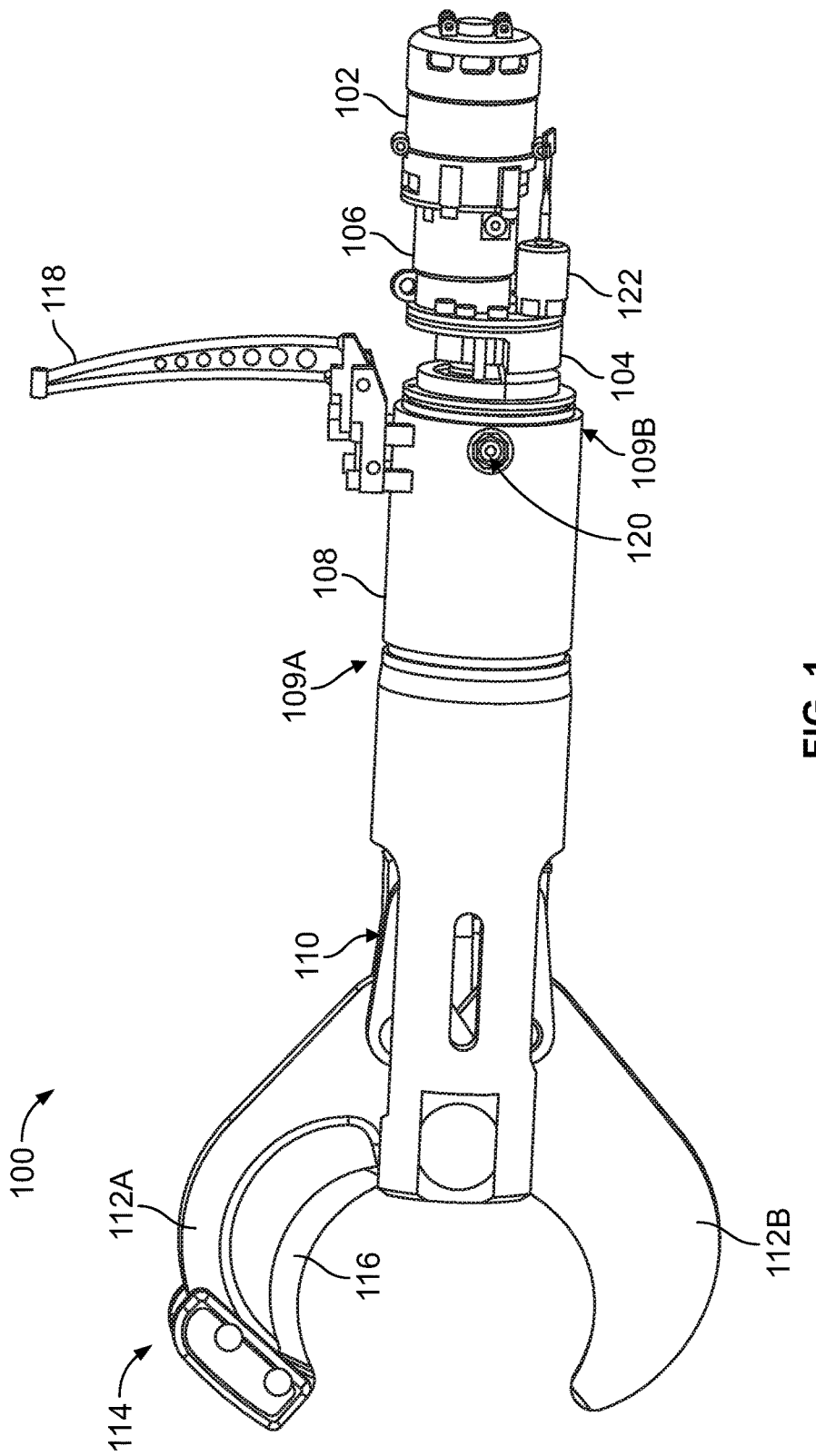
FIG. 1 illustrates a tool, in accordance with an example implementation.

FIG. 1 illustrates a tool 100, in accordance with an example implementation. Although the example implementation described herein references an example cutting tool, it should be understood that the features of this disclosure can be implemented in any other tool. In addition, any suitable size, shape or type of elements or materials could be used.

The tool 100 includes an electric motor 102 configured to drive a pump 104 by way of a gear reducer 106. The pump 104 is configured to provide pressurized hydraulic fluid to a hydraulic actuator cylinder 108, which includes a piston slidably accommodated therein. In an example, a frame and a bore of the tool 100 form the hydraulic actuator cylinder 108.

The cylinder 108 has a first end 109A and a second end 109B. The piston is coupled to a mechanism 110 that is configured to move jaws 112A and 112B of a cutting head 114. At least one of the jaws 112A and 112B has a blade such as blade 116. The first end 109A of the cylinder 108 is proximate to the jaws 112A and 112B, whereas the second end 109B is opposite the first end 109A.

When the piston is retracted, the jaws 112A and 112B are pulled back in an open position as shown in FIG. 1. When pressurized fluid is provided to the cylinder 108 by way of the pump 104, the fluid pushes the piston inside the cylinder 108, and thus the piston extends. As the piston extends, the mechanism 110 causes the jaws 112A and 112B to move toward each other, and may thus cause the blade 116 to cut a cable placed between the jaws 112A and 112B. When the cutting operation is performed, a lever 118 could be used to release the high pressure fluid back to a reservoir as described in details below.

As mentioned above, to make the tool efficient, it may be desirable to have a tool where the piston could move at variable speeds and apply different loads based on state of the tool or the cutting operation. For instance, the piston may be configured to advance rapidly at a fast speed while travelling within the cylinder 108 before the blade 116 reaches a cable to be cut. Once the blade reaches the cable, the piston may slow down, but cause the blade to apply a large force to perform the cutting operation. Described next is an example hydraulic system configured to control the tool 100.

III. Example Hydraulic System

Figure 2A:
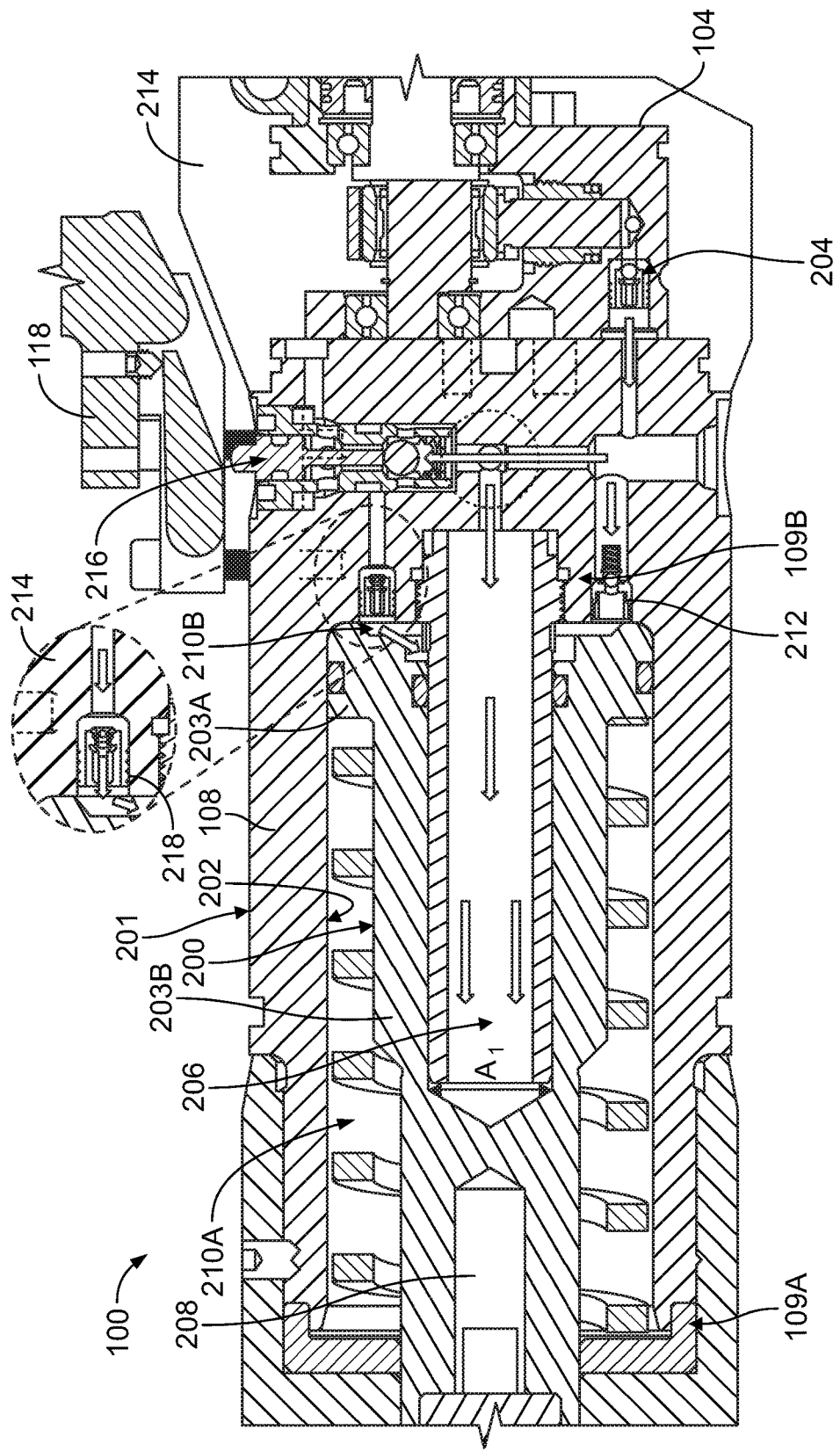
FIG. 2A illustrates a partial cross section of a side or frontal view of the tool shown in FIG. 1, in accordance with an example implementation.

FIG. 2A illustrates a partial cross section of a side or frontal view of the tool 100, in accordance with an example implementation. The tool 100 includes a partially hollow piston 200 slidably accommodated within the cylinder 108, which is formed by a frame 201 and a bore 202 of the tool 100. The piston 200 includes a piston head 203A and a piston rod 203B extending from the piston head 203A along a central axis direction of the cylinder 108. As shown, the piston 200 is partially hollow. Particularly, the piston head 203A is hollow and the piston rod 203B is partially hollow, and thus a cylindrical cavity is formed within the piston 200.

The motor 102 drives the pump 104 to provide pressurized fluid through a check valve 204 to an extension cylinder 206. The extension cylinder 206 is disposed in the cylindrical cavity formed within the partially hollow piston 200. The piston 200 is configured to slide axially about an external surface of the extension cylinder 206. However, the extension cylinder 206 is affixed to the cylinder 108 at the second end 109B, and thus the extension cylinder 206 does not move with the piston 200.

The piston 200, and particularly the piston rod 203B, is further coupled to a ram 208. The ram 208 is configured to be coupled to and drive the jaws 112A and 112B.

The piston head 203A divides an inside of the cylinder 108 into two chambers 210A and 210B. The chamber 210A is formed between the a surface of the piston head 203A that faces toward the ram 208, a surface of the piston rod 203B, and a wall of the cylinder 108 at the first end 109A. The chamber 210B is formed between the a surface of the piston head 203A that faces toward the motor 102 and the pump 104, the external surface of extension cylinder 206, and a wall of the cylinder 108 at the second end 109B. Respective volumes of the chambers 210A and 210B vary as the piston 200 moves linearly within the cylinder 108. The chamber 210B includes a portion of the extension cylinder 206.

The pump 104 is configured to draw fluid from a reservoir 214 to pressurize the fluid and deliver the fluid to the extension cylinder 206. The reservoir 214 may include fluid at a pressure close to atmospheric pressure, e.g., a pressure of 15-20 pounds per square inch (psi). Initially, the pump 104 provides low pressure fluid to the extension cylinder 206. The fluid has a path through the check valve 204 to the extension cylinder 206. The fluid is blocked at high pressure check valve 212 and a release valve 216, which is coupled to, and actuatable by, the release lever 118.

The fluid delivered to the extension cylinder 206 applies pressure on area $A_1$ within the piston 200. As illustrated, the area $A_1$ is a cross section area of the extension cylinder 206. The fluid causes the piston 200 and the ram 208 coupled thereto to advance rapidly. Particularly, if the flow rate of the fluid into the extension cylinder 206 is Q, then the piston 200 and the ram 208 move at a speed equal to $V_1$, where $V_1$ could be calculated using the following equation:

$$V_1 = \frac{Q}{A_1} \quad (1)$$

Further, if the pressure of the fluid is $P_1$, then the force $F_1$ applied on the piston 200 could be calculated using the following equation:

$$F_1 = P_1 A_1 \quad (2)$$

Further, as the piston 200 extends within the cylinder 108, hydraulic fluid is pulled or drawn from the reservoir 214 through a bypass check valve 218 into the chamber 210B. As the piston 200 begins to extend, pressure in the chamber 210B is reduced below the pressure of the fluid in the reservoir 214, and therefore the fluid in the reservoir 214 flows through the bypass check valve 218 into and the chamber 210B and fills the chamber 210B.

As the piston 200 and the ram 208 extend, the jaws 112A and 112B move toward each other in preparation for cutting a cable placed therein. As the jaws 112A and 112B reach the cable, the cable resists their motion. Increased resistance from the cable causes pressure of the hydraulic fluid provided by the pump 104 to rise.

Figure 2B:
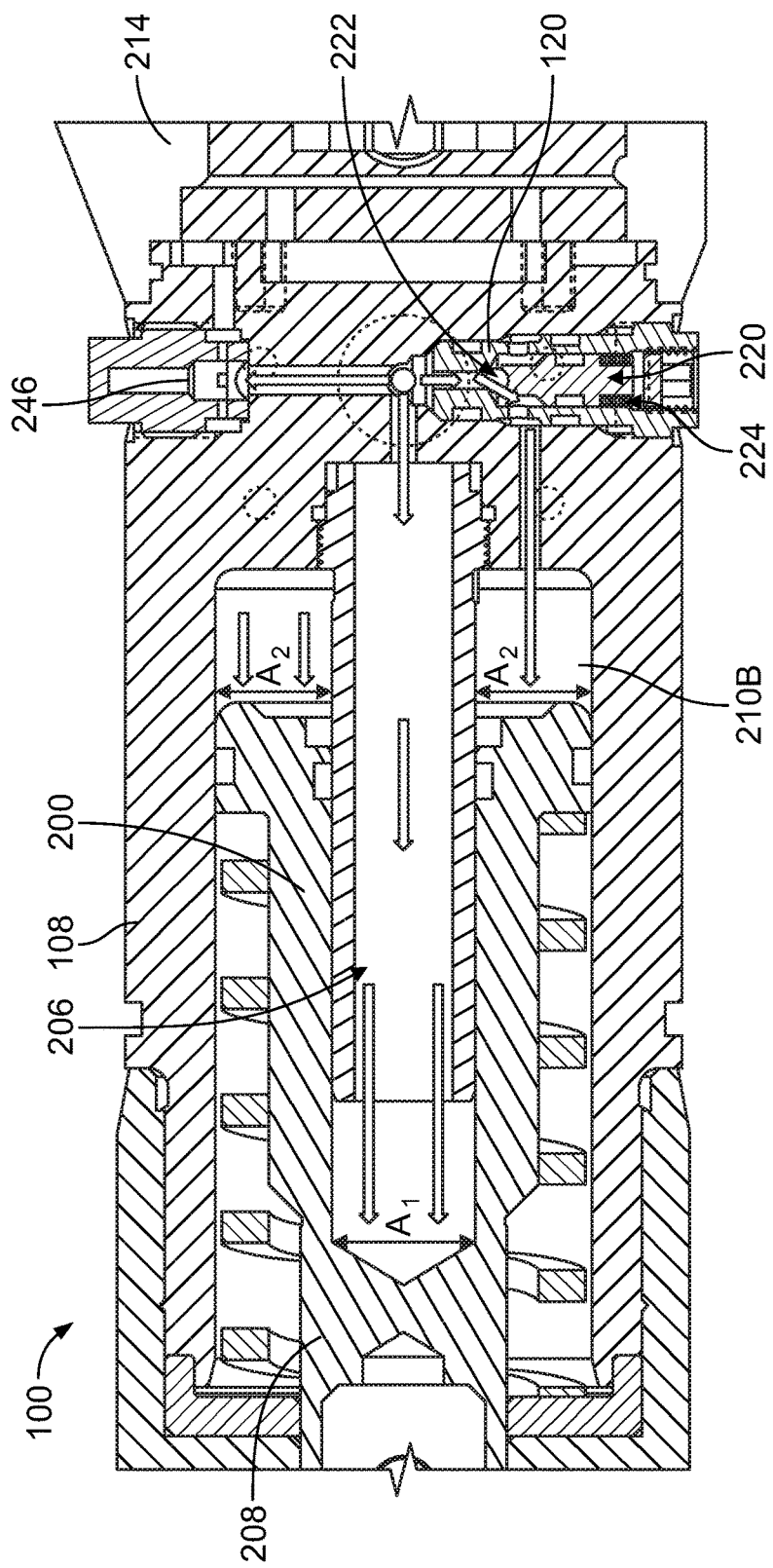
FIG. 2B illustrates a partial cross section of a top view of the tool shown in FIG. 1, in accordance with an example implementation.

Referring back to FIG. 1, the tool 100 includes a sequence valve 120. To illustrate operation of the sequence valve 120, FIG. 2B illustrates a partial cross section of a top view of the tool 100, in accordance with an example implementation. As shown in FIG. 2B, the sequence valve 120 includes a poppet 220 and a ball 222 coupled to one end of the poppet 220. A spring 224 pushes against the poppet 220 to cause the ball 222 to prevent flow through the sequence valve 120 until the fluid reaches a predetermined pressure set point that exerts a force on the ball exceeding the force applied by the spring 224 on the poppet 220. For example, the predetermined pressure set point that causes the sequence valve 120 to open could be between 350 and 600 psi; however, other pressure values are possible. This construction of the sequence valve 120 is an example construction for illustration, and other sequence valve designs could be implemented.

Once the pressure of the fluid exceeds the predetermined pressure set point, fluid pressure overcomes the spring 224 and the sequence valve 120 opens, thus allowing the fluid to enter the chamber 210B. As such, the fluid now acts on an annular area $A_2$ of the piston 200 in addition to the area $A_1$. Thus, the fluid acts on a full cross section of the piston 200 ($A_1+A_2$). For the same flow rate Q, used in equation (1), the piston 200 and the ram 208 now move at a speed equal to $V_2$, where $V_2$ could be calculated using the following equation:

$$V_2 = \frac{Q}{A_1 + A_2} \quad (3)$$

As indicated by equation (3), $V_2$ is less than $V_1$ because of the increase in the area from $A_1$ to ($A_1+A_2$), and thus the piston 200 and the ram 208 slow down to a controlled speed that achieves a controlled, more precise cutting or crimping operation. However, the pressure of the fluid has increased to a higher value, e.g., $P_2$, and thus the force applied on the piston 200 also increases and could be calculated using the following equation:

$$F_2 = P_2(A_1+A_2) \quad (4)$$

$F_2$ is greater than $F_1$ because of the area increase from $A_1$ to ($A_1+A_2$) and the pressure increase from $P_1$ to $P_2$. Thus, when the sequence valve 120 opens, high pressure hydraulic fluid can enter both the extension cylinder 206 and the chamber 210B to cause the ram 208 to apply a large force that is sufficient to cut the cable or crimp a connector at a controlled speed.

Referring back to FIG. 2A, higher pressure fluid is now filling the chamber 210B due to the opening of the sequence valve 120. The high pressure fluid pushes a ball of the bypass check valve 218 causing the bypass check valve 218 to close, thus preventing fluid from the chamber 210B to flow back to the reservoir 214. In other words, the bypass check valve 218 has fluid at reservoir pressure on one side and high pressure fluid in the chamber 210B on the other side. The high pressure fluid shuts off the bypass check valve 218, which thus does not allow fluid to be drawn from the reservoir 214 into the chamber 210B.

Referring back to FIG. 1, the tool 100 includes a pressure sensor 122 configured to provide sensor information indicative of pressure of the fluid. The pressure sensor 122 may be configured to provide the sensor information to a controller (not shown) of the tool 100.

The controller may include a processor, a memory, and a communication interface. The memory may include instructions that, when executed by the processor, cause the controller to operate the tool 100. The communication interface enables the controller to communicate with various components of the tool 100 such as the motor 102 and the sensor 122.

Once the cable is cut or a connector is crimped and the piston 200 reaches an end of its stroke within the cylinder 108, hydraulic pressure of the fluid increases because the motor 102 may continue to drive the pump 104. The hydraulic pressure may keep increasing until it reaches a threshold pressure value. In an example, the threshold pressure value could be 8500 psi; however, other values are possible. Once the controller receives information from the pressure sensor 122 that the pressure reaches the threshold pressure value, the controller may shut off the motor 102.

Figure 2C:
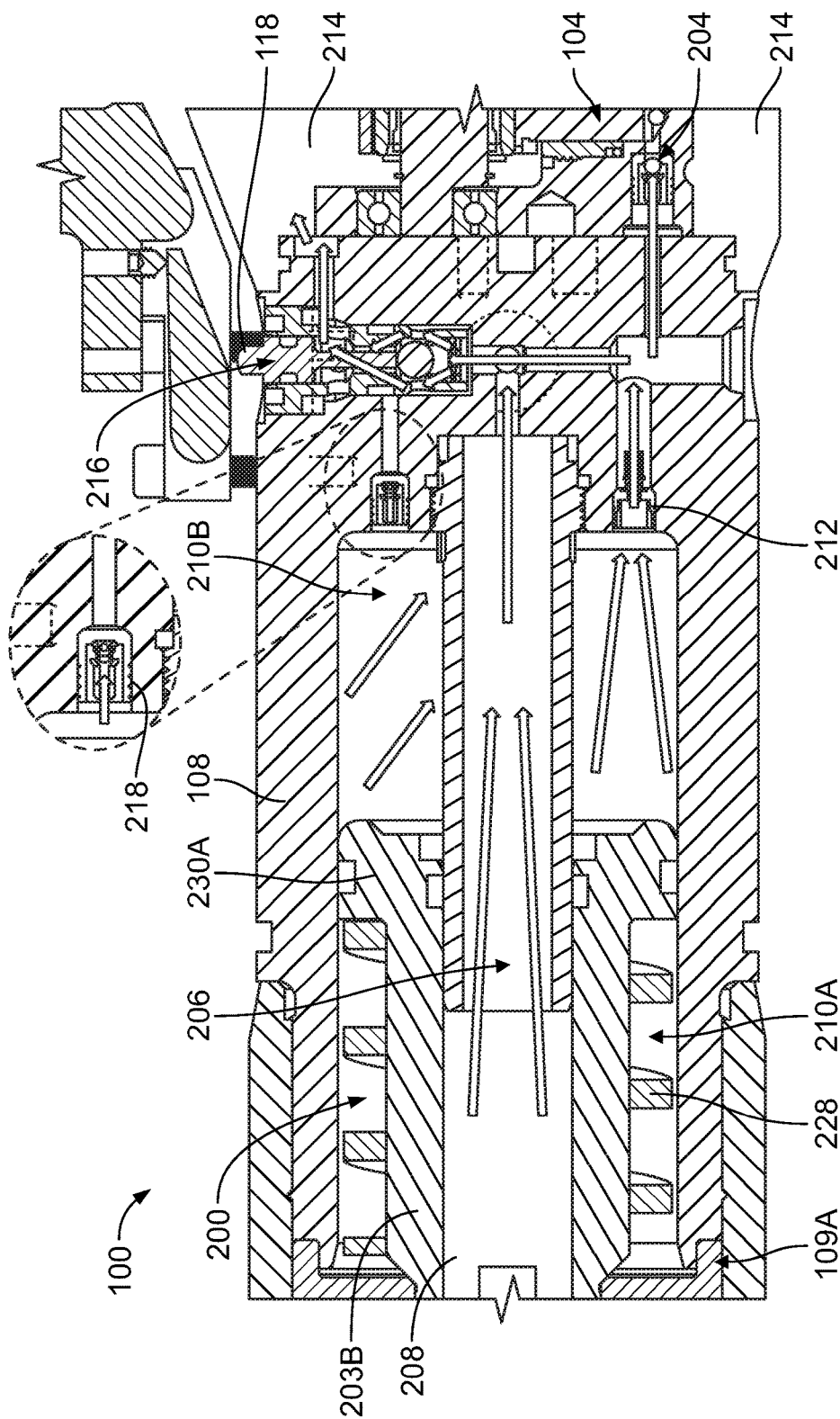
FIG. 2C illustrates another cross section of the side view of the tool showing retraction of the piston, in accordance with an example implementation.

The release lever 118 may then be actuated manually by an operator to retract the piston 200 and the ram 208 to a home or start position. FIG. 2C illustrates another cross section of the side view of the tool 100 showing retraction of the piston 200, in accordance with an example implementation. The tool 100 includes a return spring 228 disposed in the chamber 210A. The spring 228 is affixed at the end 109A of the cylinder 108 and acts on the surface of the piston head 203A that faces toward the piston rod 203B and the ram 208.

As illustrated in FIG. 2C, when the release lever 118 is actuated, the spring 228 pushes the piston head 203A back. Also, pressure of fluid in the extension cylinder 206 and the chamber 210B is higher than pressure in the reservoir 214. As a result, hydraulic fluid is discharged from the extension cylinder 206 through the release valve 216 back to the reservoir 214 as indicated by the arrows in FIG. 2C. At the same time, hydraulic fluid is discharged from the chamber 210B through the high pressure check valve 212 and the release valve 216 back to the reservoir 214, while being blocked by the check valve 218 and the check valve 204. Particularly, the check valve 204 prevents back flow into the pump 104.

Figure 2D:
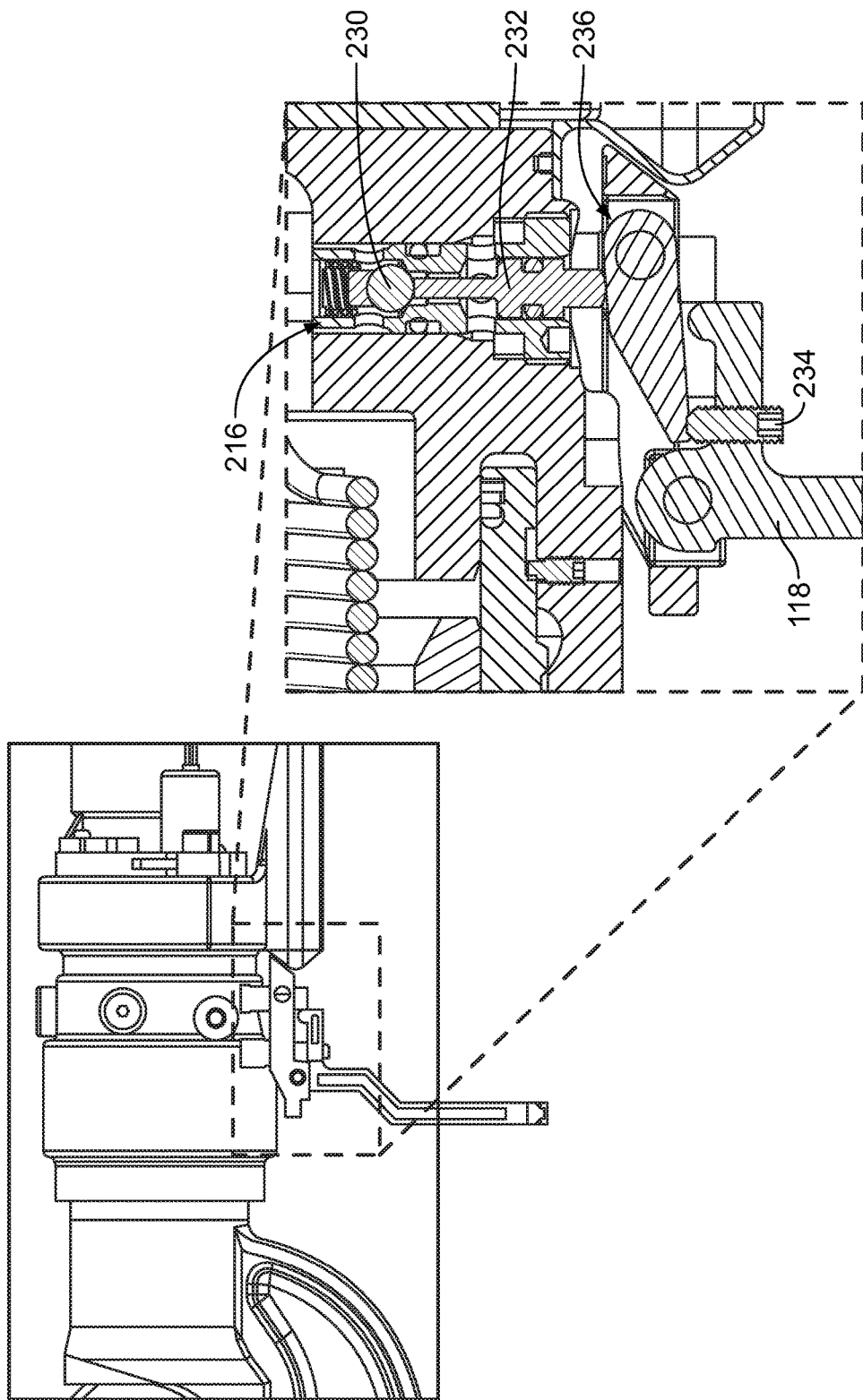
FIGS. 2D, 2E, and 2F illustrate operation of a release lever and a release valve, in accordance with an example implementation
Figure 2E:
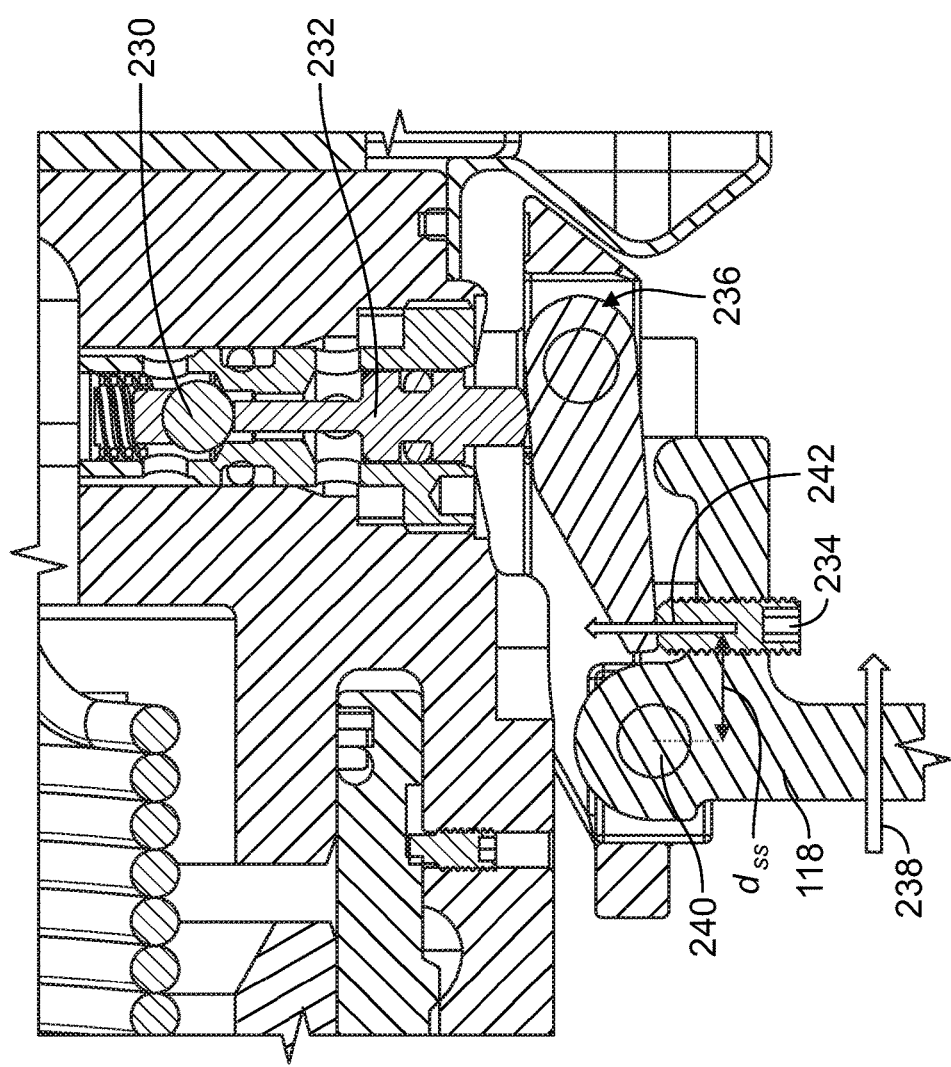
Figure 2F:
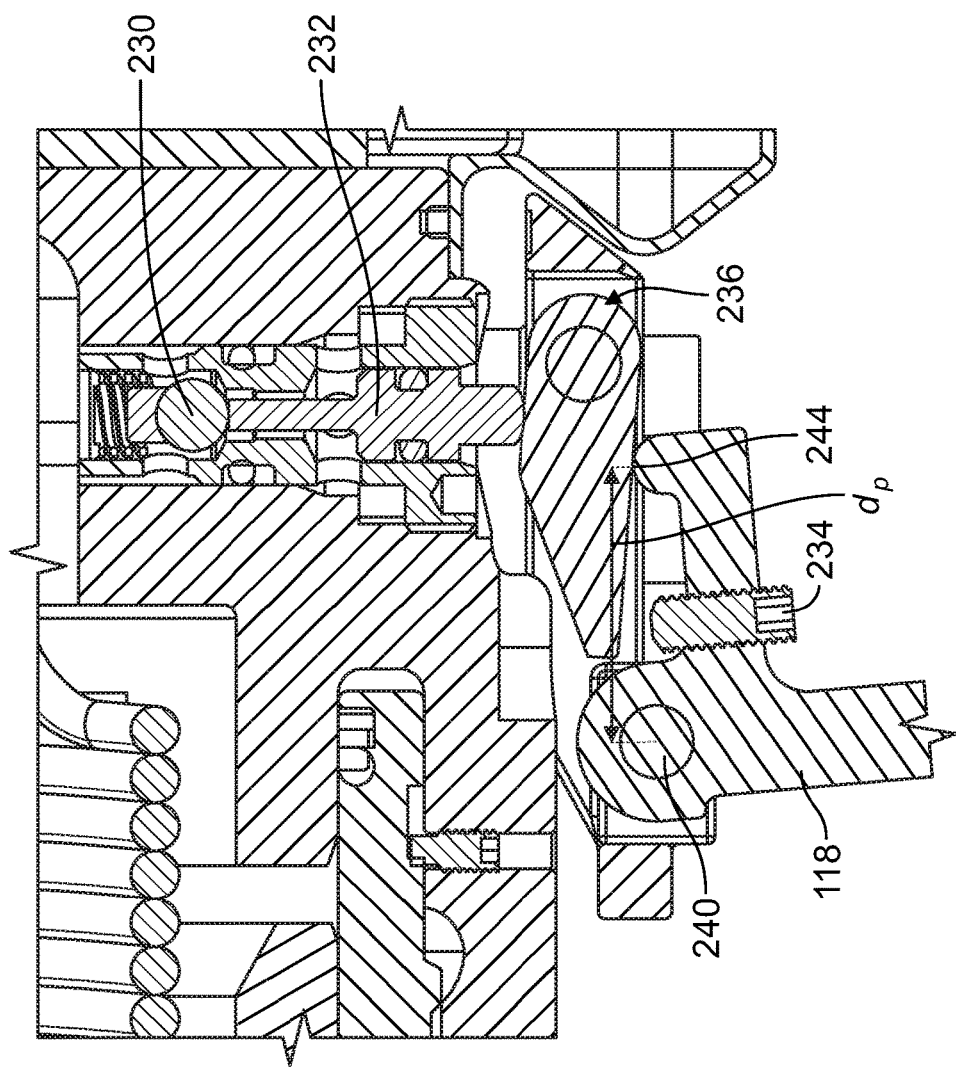

FIGS. 2D, 2E, and 2F illustrate operation of the release lever 118 and the release valve 216, in accordance with an example implementation. The view shown in FIGS. 2D-2F is upside down compared to FIGS. 2B-2C, and is a zoomed view of a release mechanism including the release lever 118 and the release valve 216.

As shown in FIG. 2D, the release valve 216 includes a valve ball 230 and a valve poppet or pin 232. A set screw 234 is coupled to the release lever 118. The set screw 234 and the release lever 118 are configured to drive a lever 236, which is configured to push on the valve pin 232. The release mechanism illustrated in FIGS. 2D-2F provides a two stage release operation, and enhances the release operation as described next.

Referring to FIG. 2E, an operator pushes the release lever 118 in a direction of arrow 238 (i.e., to the right in FIG. 2E), thus causing the set screw 234 to push on the lever 236. The lever 236 in turn pushes on the valve pin 232. The valve pin 232 moves the valve ball 230 off its seat, releasing the high pressure by allowing high pressure fluid to go around the now unseated valve ball 230 to the reservoir 214. This operation requires high force due to the high fluid pressure forcing the valve ball 230 into the seat.

To achieve this high force, it is noted that a hinge 240 of the release lever 118 operates as a fulcrum. As shown in FIG. 2E, a horizontal distance between the set screw 234 and the hinge (fulcrum) 240 is small, and thus the force that the set screw 234 applies on the lever 236 is high by virtue of the lever law of a fulcrum. A fulcrum equation can be used to express relationship between the force applied by the operator on the release lever 118 and the force that the set screw 234 applies on the lever 236 as follows:

$$F_L d_L = F_{SS} d_{SS} \quad (5)$$

where $F_L$ is a force related to the force applied on the release lever 118 by the operator, $d_L$ is a distance between point of application of the force on the release lever and the hinge 240, $F_{SS}$ is the force applied by the set screw 234 on the lever 236, and $d_{SS}$ is a distance between the set screw 234 and the hinge 240.

As indicated by equation (5), the smaller the distance $d_{SS}$, the higher the force $F_{SS}$ applied by the set screw 234 on the lever 236 assuming $F_L$ and $d_L$ are constant. Thus, when the release lever 118 is initially pushed by the operator, a high force $F_{SS}$ is applied by the set screw 234 to overcome the high pressure fluid pushing on the valve ball 230. However, the distance moved by the set screw 234 in a direction of arrow 242 is small.

Once the release lever 118 moves far enough, the set screw 234 loses contact with the lever 236 as shown in FIG. 2F. Thereafter, a protrusion 244 coupled to the release lever 118 contacts the lever 236. A fulcrum equation can be used to express relationship between the force applied by the operator on the release lever 118 and the force that the protrusion 234 applies on the lever 236 as follows:

$$F_L d_L = F_P d_P \qquad (6)$$

where $F_P$ is the force applied by the protrusion 244 on the lever 236, and $d_P$ is a distance between the protrusion 244 and the hinge 240.

As indicated by FIGS. 2E and 2F, the distance $d_P$ is larger than the distance $d_{SS}$. Thus, although the force $F_P$ applied by the protrusion 244 on the lever 236 is less than the force $F_{SS}$, the distance or stroke moved by the protrusion 244 is larger than the distance or stroke moved by the set screw 234. This larger stroke allows the valve ball 230 to be moved farther off the seat, thus increasing flow to the reservoir 214 and reducing return time for the ram 208.

Thus, the construction of the release lever 118 as shown in FIGS. 2D-2F, allows the release lever 118 to have two stages of operation. The first stage facilitates applying a high force by the set screw 234 on the lever 236 to initially break the fluid pressure applied on the valve ball 230, but allows the set screw 234 to move a small distance or stroke. The second stage facilitates applying a low force by the protrusion 244 on the lever 236, but allows the protrusion 244 to have a larger stroke compared to the stroke of the set screw 234 to increase flow through the release valve 216.

Referring back to FIG. 1, if the pressure sensor 122 fails, hydraulic fluid pressure within the tool 100 may increase to unsafe levels because the controller might not receive information indicating the pressure of the fluid and might not shut off the motor 102 when pressure exceeds a threshold. Thus, a relief valve could be added to the tool 100 to relieve pressure if the pressure sensor 122 fails and the controller does not shut off the motor 102.

However, to save space and reduce weight and cost, the tool 100 illustrated herein includes a burst disk 246 shown in FIG. 2B is used to prevent an over pressure situation. Specifically, if controller does not shut off the motor 102 and the motor 102 continues to run and build hydraulic pressure within the tool 100, the burst disk 246 would rupture and open up at a pre-determined or threshold pressure. For example, this predetermined or threshold pressure that would rupture the burst disk 246 could be 15000 psi; however, other pressure values are possible. In this manner, hydraulic fluid would have a path to the reservoir 214 through the ruptured burst disk 246, and pressure would be relieved.

IV. Hydraulic Circuit

Figure 3:
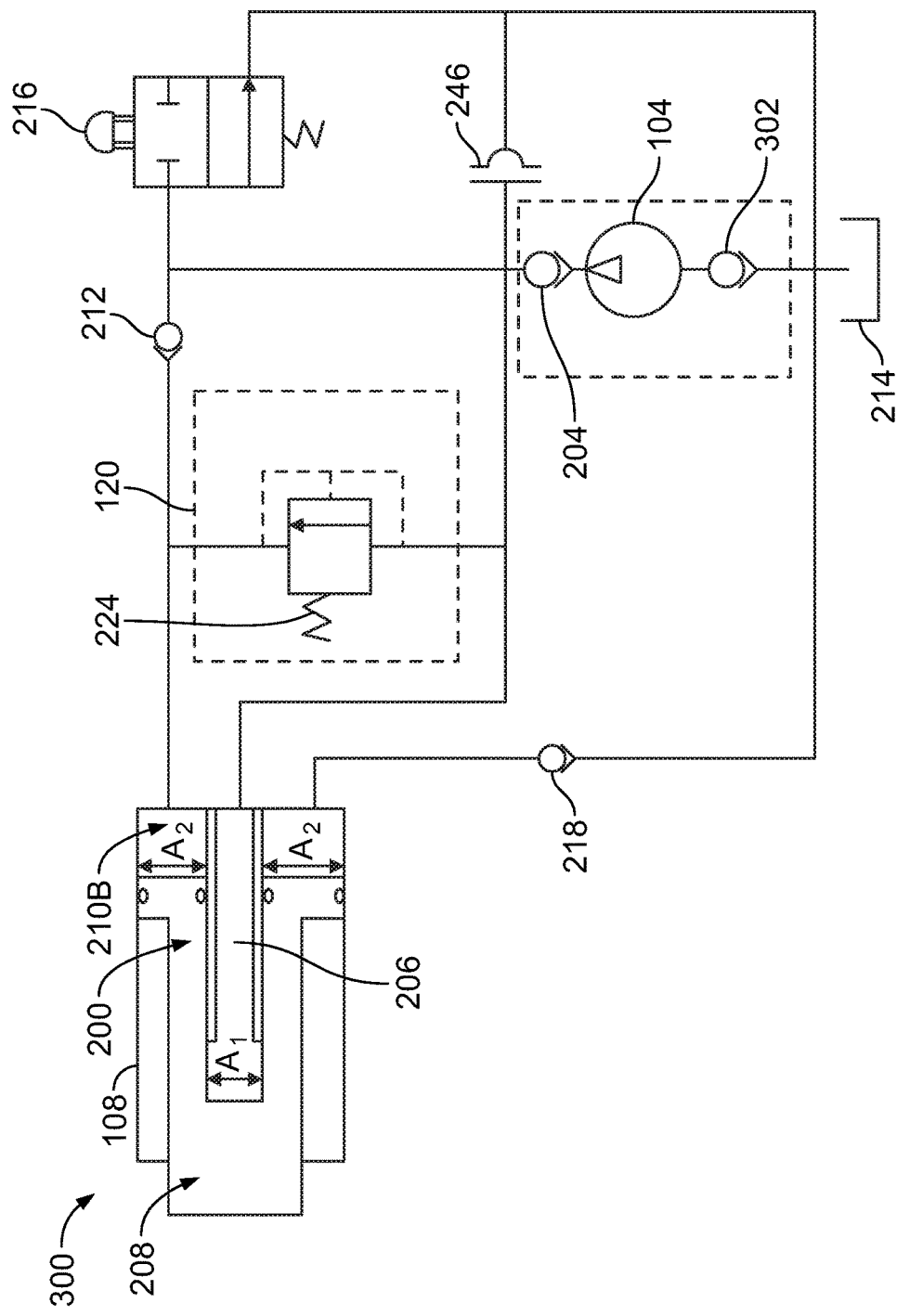
FIG. 3 illustrates a hydraulic circuit of the tool shown in FIG. 1, in accordance with an example implementation.

FIG. 3 illustrates a hydraulic circuit 300 of the hydraulic tool 100, in accordance with an example implementation. Operation of the tool 100 as described above can be summarized using the hydraulic circuit 300.

In an example, the tool 100 may include a trigger that could, for instance, be coupled to a handle of the tool 100. When an operator of the tool 100 depresses the trigger, the controller of the tool 100 receives a signal from the trigger and turns the motor 102 on. The motor 102 drives the pump 104, which draws fluid from the reservoir 214 through an intake check valve 302, pressurizes the fluid, and provides the fluid through the check valve 204 to the extension cylinder 206.

Pressure of the fluid builds as a result of the resistance applied to motion of the ram 208 from the cable or crimp connector as the motor 102 continues to drive the pump 104, but initially, the pressure of the fluid is relatively low. At low pressure, hydraulic fluid can only access the extension cylinder 206 and cause the piston 200 and the ram 208 to extend rapidly because the fluid acts on a small area ($A_1$). The force applied on the piston 200, however, is relatively small is indicated by equation (2) above.

As the ram 208 extends, hydraulic fluid is pulled from the reservoir 214 into the chamber 210B within the cylinder 108 through the bypass check valve 218, to ensure that the chamber 210B fills with hydraulic fluid. However, the high pressure check valve 212 prevents high pressure hydraulic fluid discharged from the pump 104 from entering the chamber 210B. The piston 200 and the ram 208 extend rapidly until the jaws 112A and 112B shown in FIG. 1 contact a cable placed therebetween.

As cable cutting starts, the cable resists motion of the jaws 112A and 112B, and thus resists extension of the ram 208. Consequently, hydraulic pressure rises in the system. Once the pressure exceeds a predetermined threshold or set point determined by spring rate of the spring 224 of the sequence valve 120, the sequence valve 120 will open, allowing high pressure hydraulic fluid discharged from the pump 104 to enter the chamber 210B.

The fluid now acts on an area equal to ($A_1 + A_2$), or the full cross section of the piston 200. Thus, the speed of extension of the piston 200 decreases as indicated by equation (3), whereas the force that the piston 200, and the jaws 112A-B, exerts increases as indicated by equation (4). Therefore, the area and volume of the extension cylinder 206 is minimized to provide a rapid advance at low pressure, whereas the area in the chamber 210B is maximized to provide maximum force at high pressure and controlled cut speed.

Once the cable is cut and the piston 200 and the ram 208 reach the end of stroke, the piston 200 becomes dead-headed and hydraulic pressure increases until it reaches a threshold or set point pressure. The pressure sensor 122 provides information to the controller of the tool 100, and the controller shuts off the motor 102, and the pump 104 stops providing pressurized fluid.

The release lever 118 could then be actuated by the operator to actuate the release valve 216 and retract the piston 200 and the ram 208 back to the start or home position. When the release lever 118 is actuated, hydraulic fluid flows from the extension cylinder 206 through the release valve 216 back to the reservoir 214, while being blocked by the check valve 204. At the same time, hydraulic fluid flows from the chamber 210B through the high pressure check valve 212 and the release valve 216 back to the reservoir 214, while being blocked by the check valve 218 and the check valve 204. Particularly, the check valve 204 prevents back flow into the pump 104.

The burst disk 246 is used to prevent an over pressure situation. If the motor 102 would continue to run and build hydraulic pressure, the burst disk 246 would open up at a pre-determined pressure, allowing hydraulic fluid to return back to the reservoir 214.

V. Conclusion

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A tool comprising:
   a hydraulic actuator cylinder;
   a piston slidably accommodated within the hydraulic actuator cylinder, wherein the piston includes a piston head and a piston rod extending from the piston head along a central axis direction of the hydraulic actuator cylinder, wherein the piston head divides an inside of the hydraulic actuator cylinder into a first chamber and a second chamber, wherein the piston is partially hollow, and wherein the piston rod is disposed in the first chamber and configured to move one or more jaws of the tool;
   a pump configured to provide pressurized fluid;
   a sequence valve configured to block the pressurized fluid from flowing into the second chamber of the hydraulic actuator cylinder until pressure of the pressurized fluid exceeds a threshold pressure value, wherein when the tool is triggered:
   the pump provides the pressurized fluid to a hollow portion of the piston, causing the piston to extend at a first speed until at least one of the one or more jaws reach an object placed therebetween, and
   thereafter, pressure of the pressurized fluid increases until the pressure reaches the threshold pressure value, causing the sequence valve to open providing a path for the pressurized fluid to the second chamber, causing the piston to extend at a second speed; and
   a high pressure check valve configured to prevent the pressurized fluid from flowing into the second chamber as the piston extends at the first speed.

2. The tool of claim 1, wherein the hydraulic actuator cylinder has a first end proximate to the one or more jaws and a second end opposite the first end, wherein the first chamber is formed between the piston head, the piston rod, and the first end of the hydraulic actuator cylinder, and wherein the second chamber is formed between the piston head and the second end of the hydraulic actuator cylinder.

3. The tool of claim 1, further comprising:
   an extension cylinder disposed within the partially hollow piston, wherein the extension cylinder is affixed to the hydraulic actuator cylinder at the second end, wherein the piston is configured to slide axially about an external surface of the extension cylinder as the piston extends, and wherein the pump provides the pressurized fluid to the hollow portion of the piston through the extension cylinder, causing the piston to extend at the first speed.

4. The tool of claim 3, wherein the second chamber includes a portion of the extension cylinder.

5. The tool of claim 1, further comprising:
   a bypass check valve; and
   a reservoir containing fluid having a respective pressure less than the pressure of the pressurized fluid, wherein, as the piston extends at the first speed, the bypass check valve allows fluid to be drawn from the reservoir into the second chamber to fill the second chamber.

6. The tool of claim 5,
   wherein the high pressure check valve is configured to provide a path for fluid in the second chamber to flow back to the reservoir.

7. The tool of claim 1, wherein when the sequence valve opens, the pressurized fluid flows into both the hollow portion and the second chamber.

8. The tool of claim 1, wherein the threshold pressure value is a first threshold pressure value, the tool further comprising:
   a motor configured to drive the pump;
   a pressure sensor configured to provide sensor information indicative of the pressure of the pressurized fluid; and
   a controller in communication with the motor and the pressure sensor, and configured to receive the sensor information from the pressure sensor, wherein the controller is configured to shut-off the motor when the sensor information indicates that the pressure has exceeded a second threshold pressure value.

9. The tool of claim 8, wherein the pressure reaches the second threshold pressure value after the piston reaches an end of stroke of the piston within the hydraulic actuator cylinder.

10. The tool of claim 1, further comprising:
    a manually operated release lever; and
    a release valve actuatable by the release lever, wherein actuation of the release lever actuates the release valve, causing the release valve to provide a respective path for fluid within the hollow portion and the second chamber to flow back to a reservoir containing respective fluid having a respective pressure less than the pressure of the pressurized fluid.

11. The tool of claim 10, wherein the release valve comprises a valve pin coupled to a valve ball, and wherein actuation of the release lever moves a lever coupled to the valve pin to apply a force on the valve pin to move the valve ball off of a seat of the valve ball and provide the respective path for the fluid within the hollow portion.

12. The tool of claim 11, wherein the manually operated release lever is coupled to the tool by way of a hinge operable as a fulcrum, wherein the manually operated release lever comprises a screw and a protrusion, wherein the screw is closer to the hinge than the protrusion, such that the screw initially applies a first force on the lever, then loses contact with the lever as the protrusion contacts the lever to apply a second force on the lever, and wherein the second force is less than the first force.

13. The tool of claim 1, wherein the threshold pressure value is a first threshold pressure value, the tool further comprising:
    a burst disk in fluid communication with the pressurized fluid, wherein the burst disk is configured to rupture when the pressure of the pressurized fluid exceeds a second threshold pressure value, and wherein the ruptured burst disk provides a respective path for the pressurized fluid to flow back to a reservoir containing respective fluid having a respective pressure less than the pressure of the pressurized fluid.

14. The tool of claim 1, further comprising:
a frame and a bore formed therein, wherein the frame and the bore form the hydraulic actuator cylinder.

15. A hydraulic circuit, comprising:
a hydraulic actuator cylinder;
a piston slidably accommodated within the hydraulic actuator cylinder, wherein the piston includes a piston head and a piston rod extending from the piston head along a central axis direction of the hydraulic actuator cylinder, wherein the piston head divides an inside of the hydraulic actuator cylinder into a first chamber and a second chamber, wherein the piston is partially hollow, and wherein the piston rod is disposed in the first chamber;
a pump configured to provide pressurized fluid;
a sequence valve configured to block the pressurized fluid from flowing into the second chamber of the hydraulic actuator cylinder until pressure of the pressurized fluid exceeds a threshold pressure value, wherein:
the pump provides the pressurized fluid to a hollow portion of the piston, causing the piston to extend at a first speed until the piston rod meets a resistance, and
thereafter, pressure of the pressurized fluid increases until the pressure reaches the threshold pressure value, causing the sequence valve to open providing a path for the pressurized fluid to the second chamber, causing the piston to extend at a second speed; and
a high pressure check valve configured to prevent the pressurized fluid from flowing into the second chamber as the piston extends at the first speed.

16. The hydraulic circuit of claim 15, wherein the hydraulic actuator cylinder has a first end proximate to the one or more jaws and a second end opposite the first end, wherein the first chamber is formed between the piston head, the piston rod, and the first end of the hydraulic actuator cylinder, and wherein the second chamber is formed between the piston head and the second end of the hydraulic actuator cylinder.

17. The hydraulic circuit of claim 15, further comprising:
an extension cylinder disposed within the partially hollow piston, wherein the extension cylinder is affixed to the hydraulic actuator cylinder at the second end, wherein the piston is configured to slide axially about an external surface of the extension cylinder as the piston extends, and wherein the pump provides the pressurized fluid to the hollow portion of the piston through the extension cylinder, causing the piston to extend at the first speed.

18. The hydraulic circuit of claim 17, wherein the second chamber includes a portion of the extension cylinder.

19. The hydraulic circuit of claim 14, further comprising:
a bypass check valve; and
a reservoir containing fluid having a respective pressure less than the pressure of the pressurized fluid, wherein, as the piston extends at the first speed, the bypass check valve allows fluid to be drawn from the reservoir into the second chamber to fill the second chamber.

20. The hydraulic circuit of claim 19,
wherein the high pressure check valve is configured to provide a path for fluid in the second chamber to flow back to the reservoir.

21. The hydraulic circuit of claim 20, further comprising:
a manually operated release lever; and
a release valve actuatable by the release lever, wherein actuation of the release lever actuates the release valve, causing the release valve to provide a respective path for fluid within the hollow portion to flow back to the reservoir.

22. The hydraulic circuit of claim 15, wherein when the sequence valve opens, the pressurized fluid flows into both the hollow portion and the second chamber.

* * * * *